Feb. 10, 1970 J. D. HARPER ET AL 3,494,140
LIQUID NITROGEN FLASH FREEZING
Filed Oct. 17, 1967 13 Sheets-Sheet 1
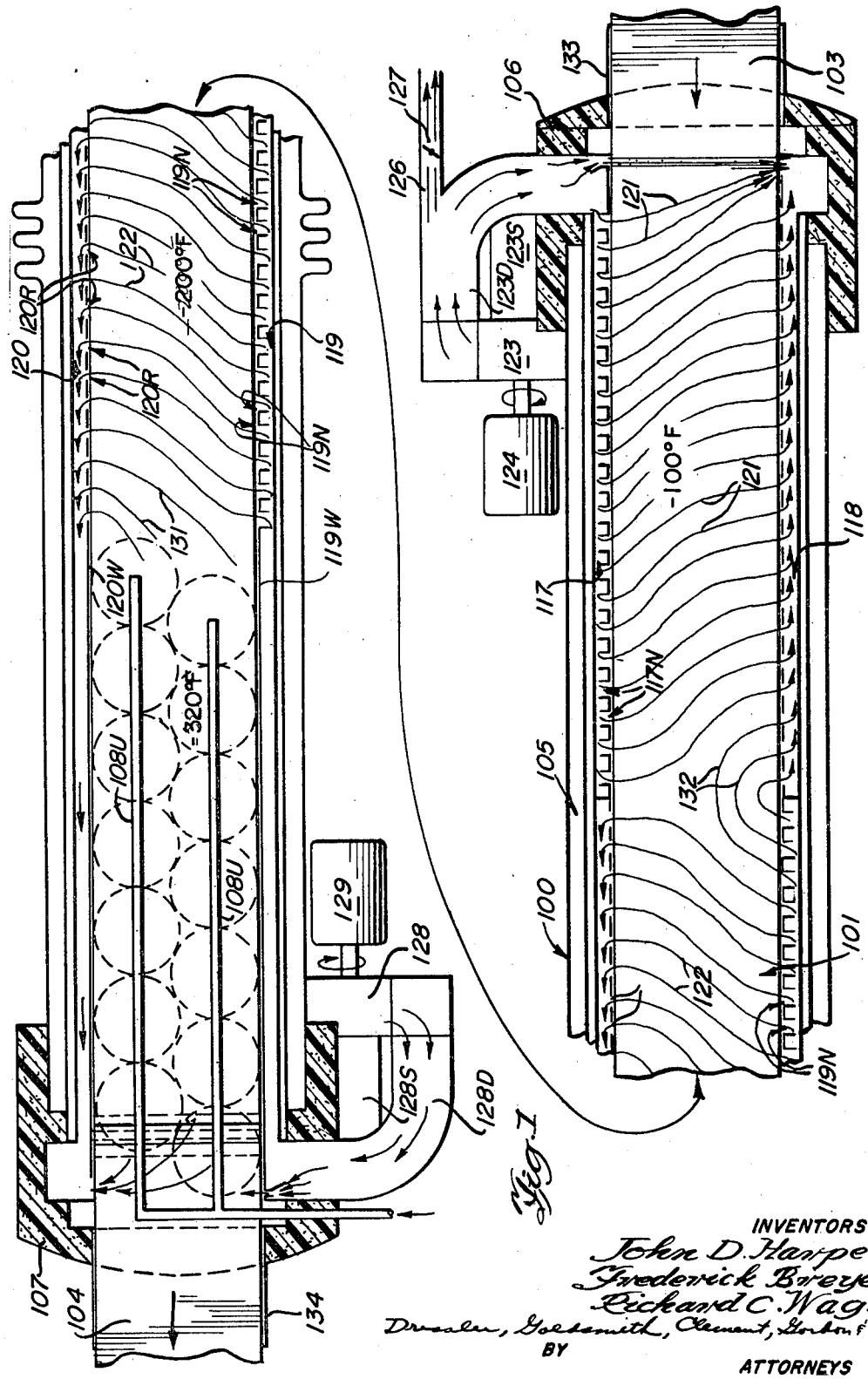
INVENTORS
John D. Harper
Frederick Breyer
Richard C. Wagner
Dressler, Goldsmith, Clement, Gordon & Ladd
BY ATTORNEYS

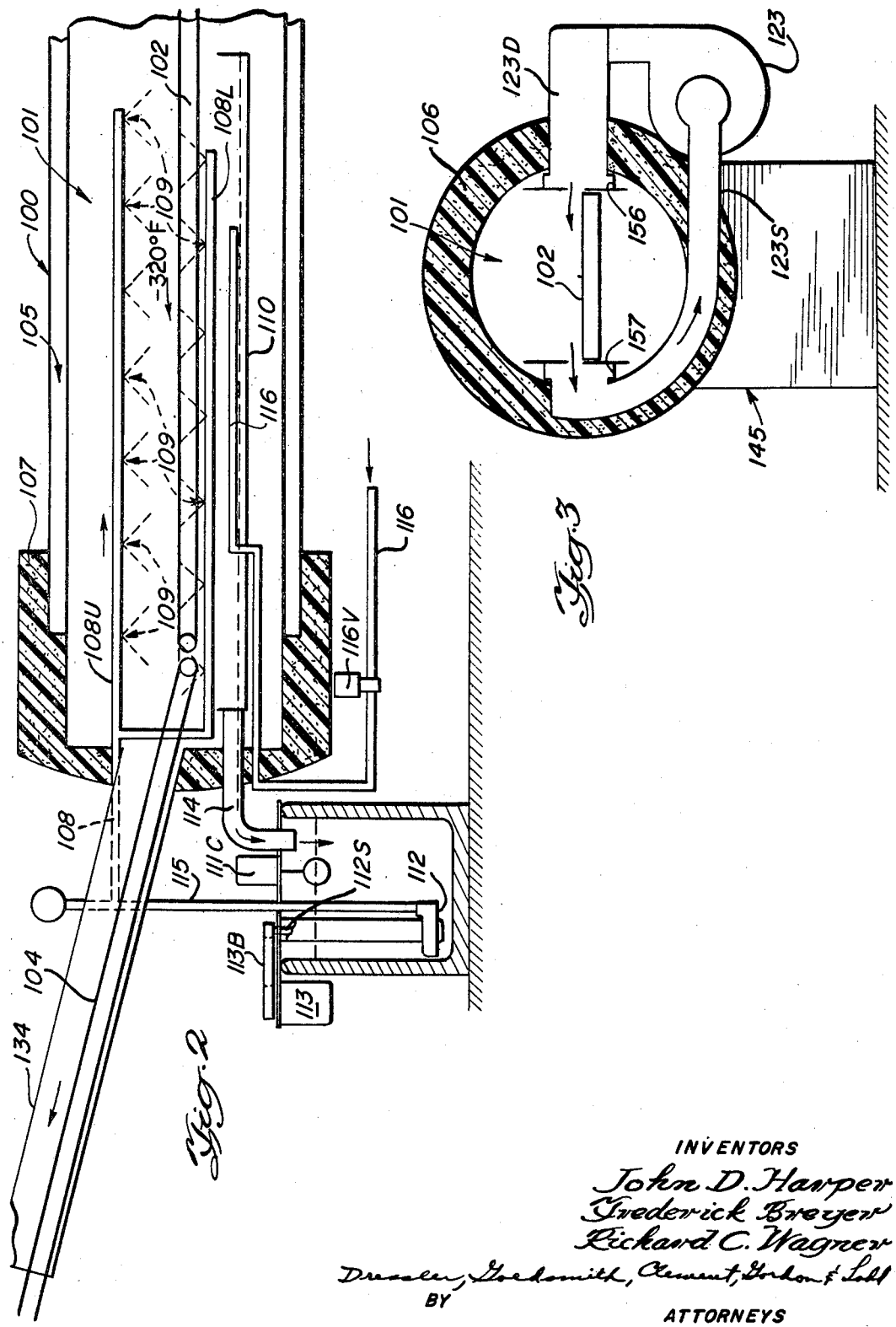

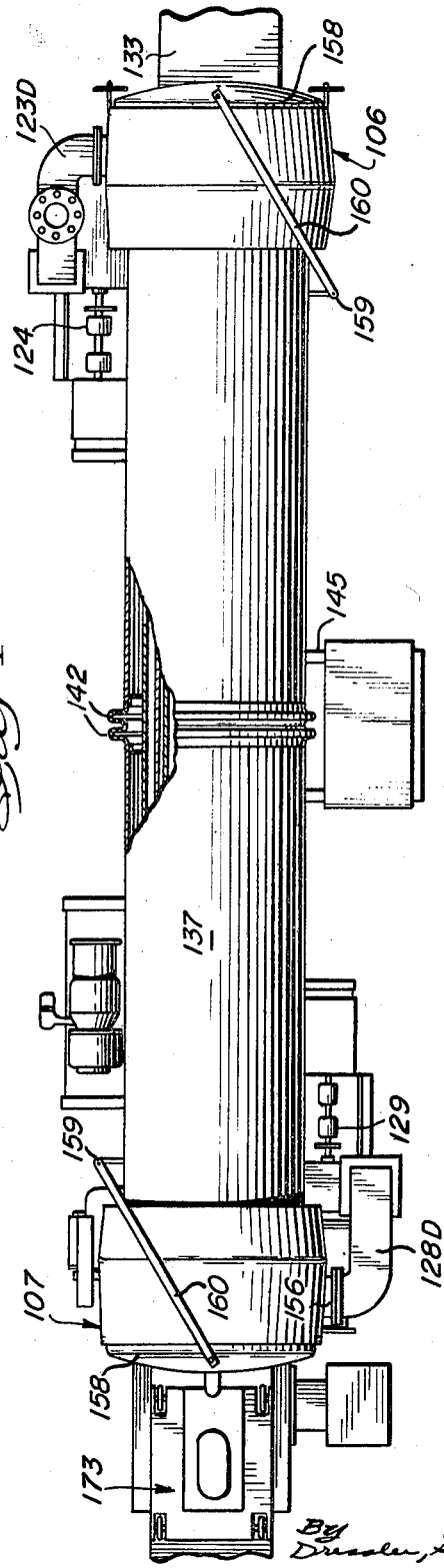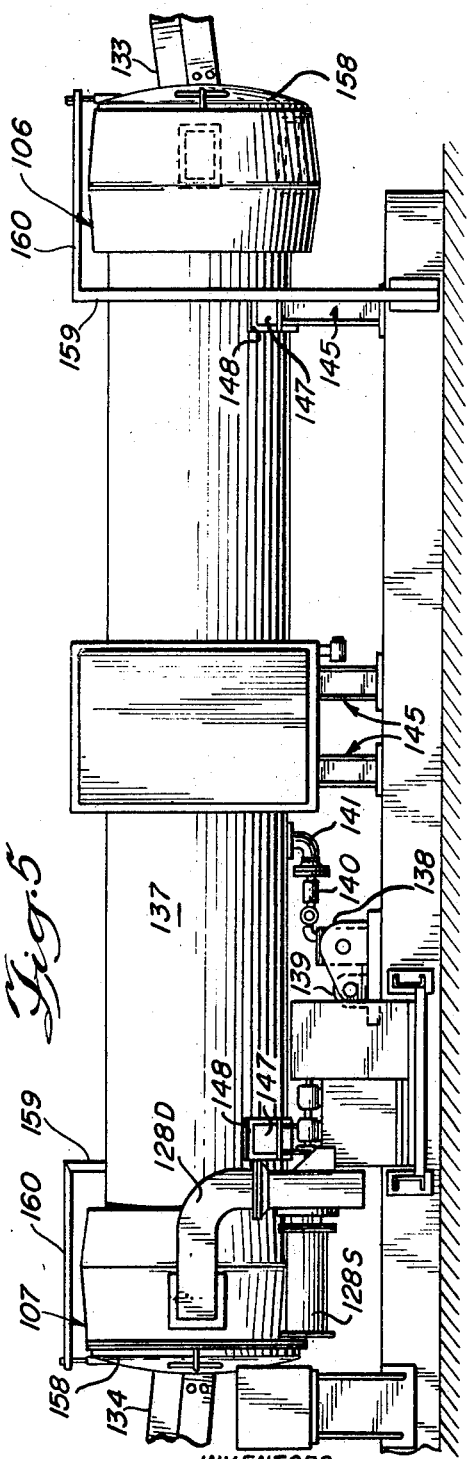

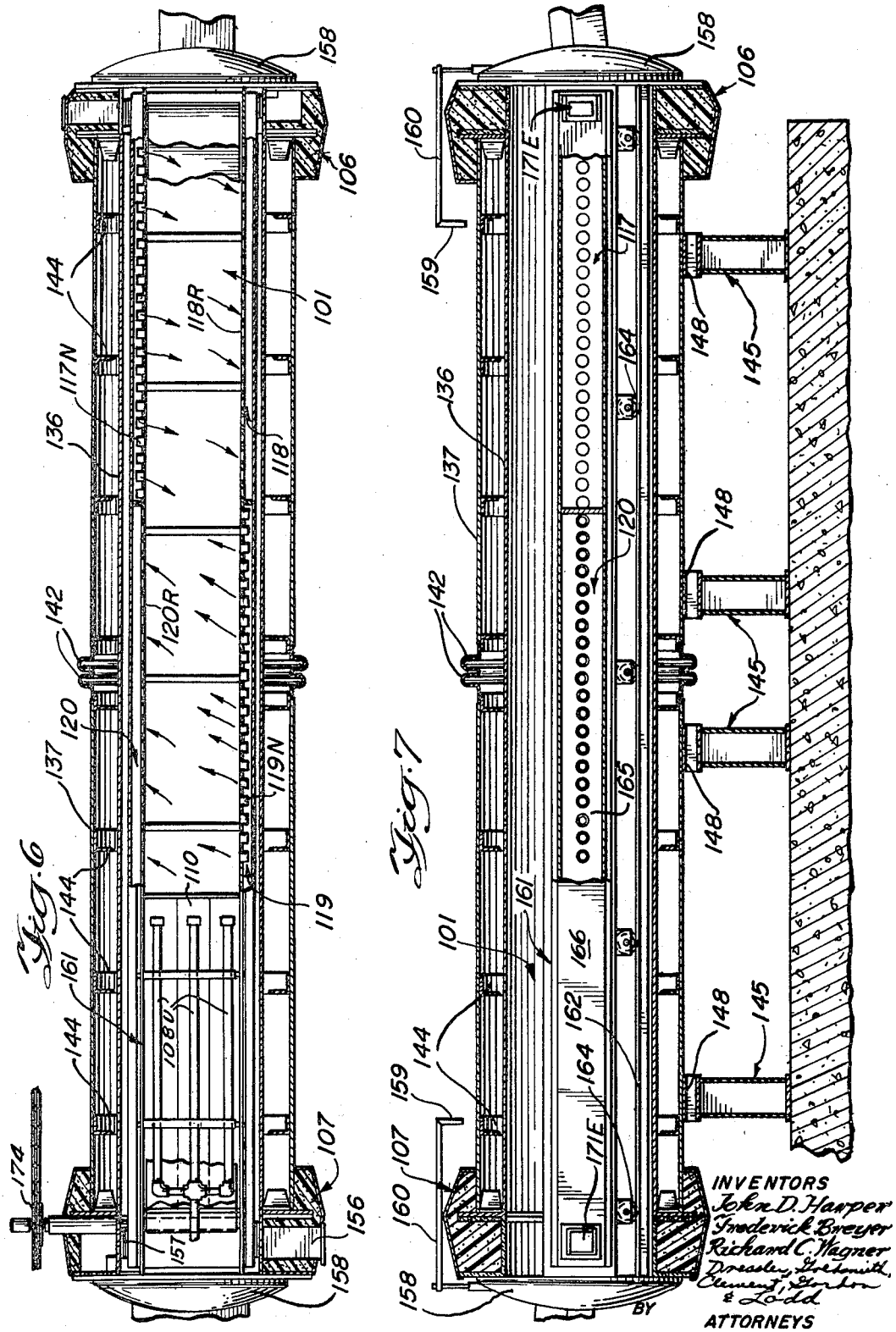

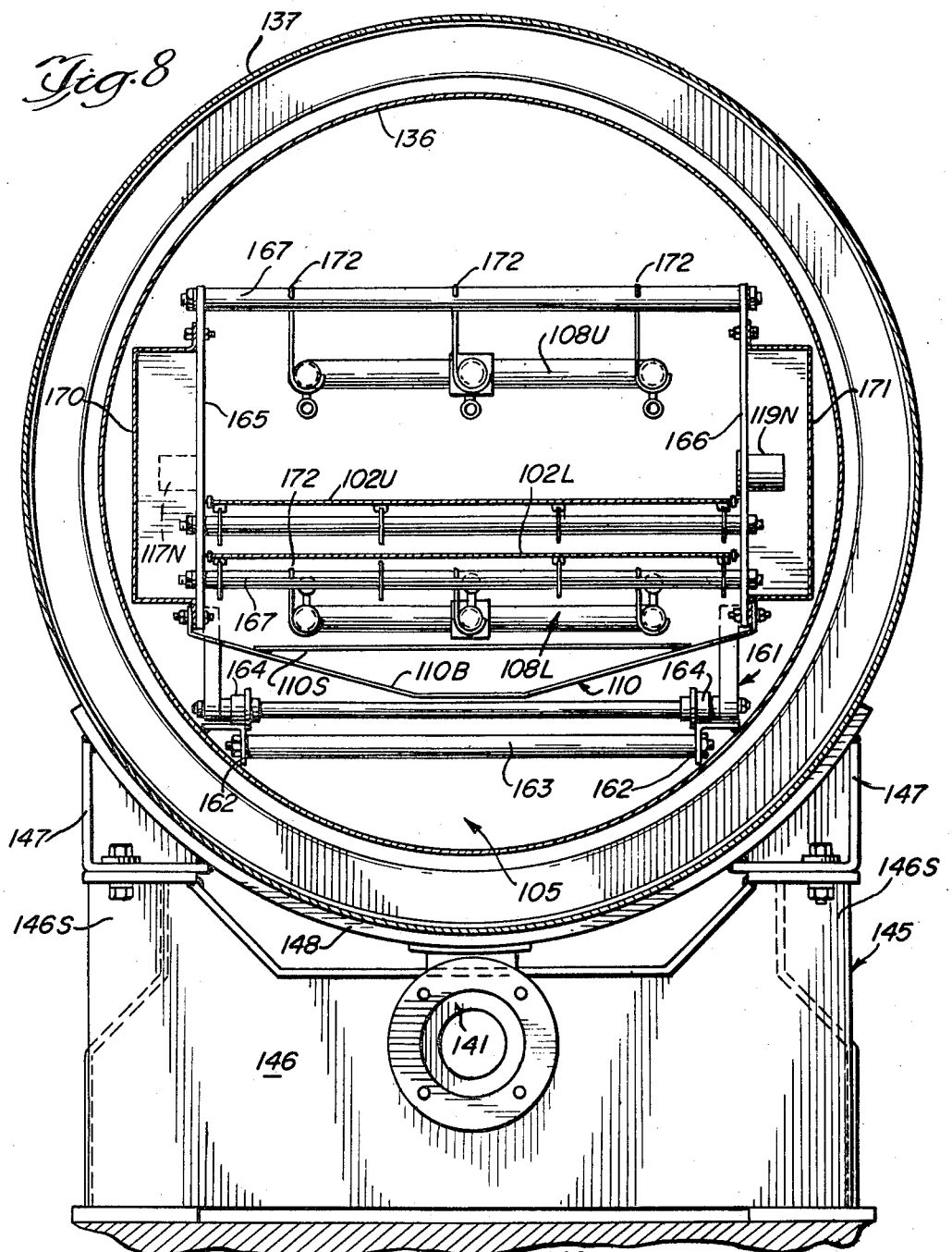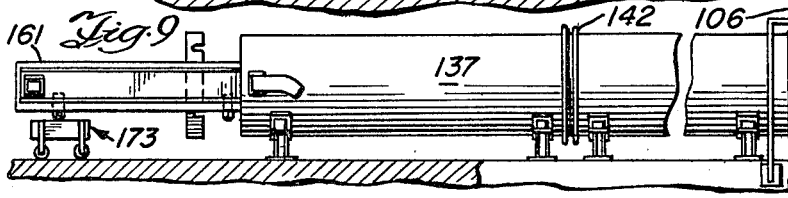

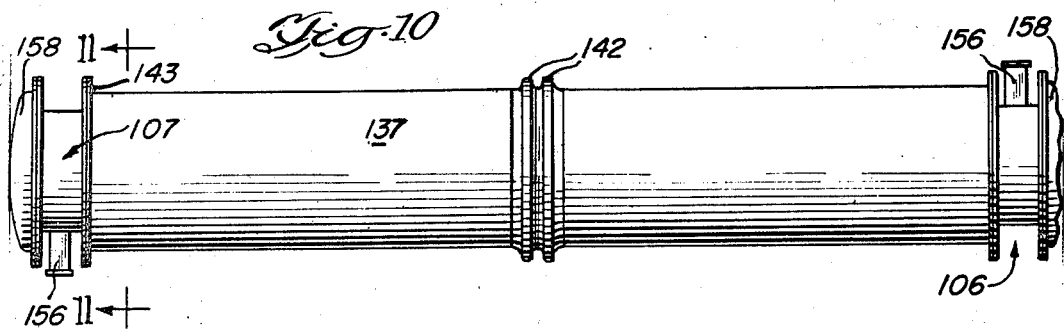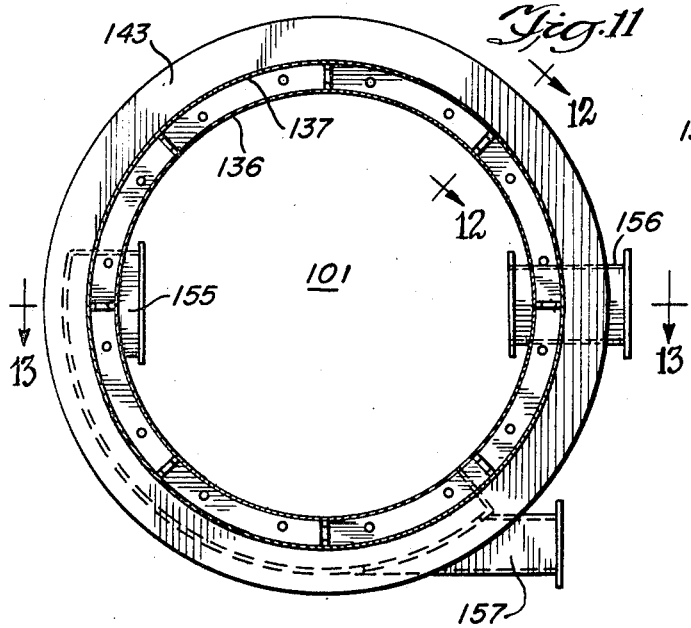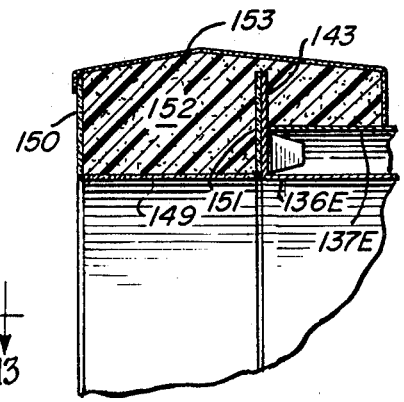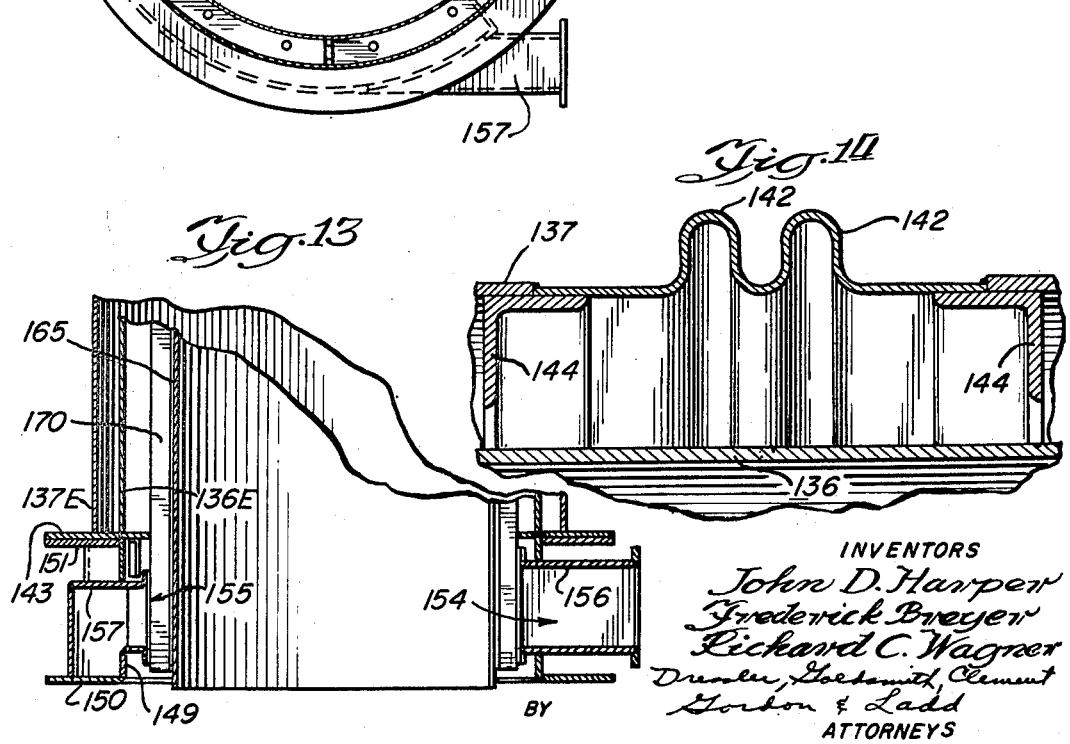

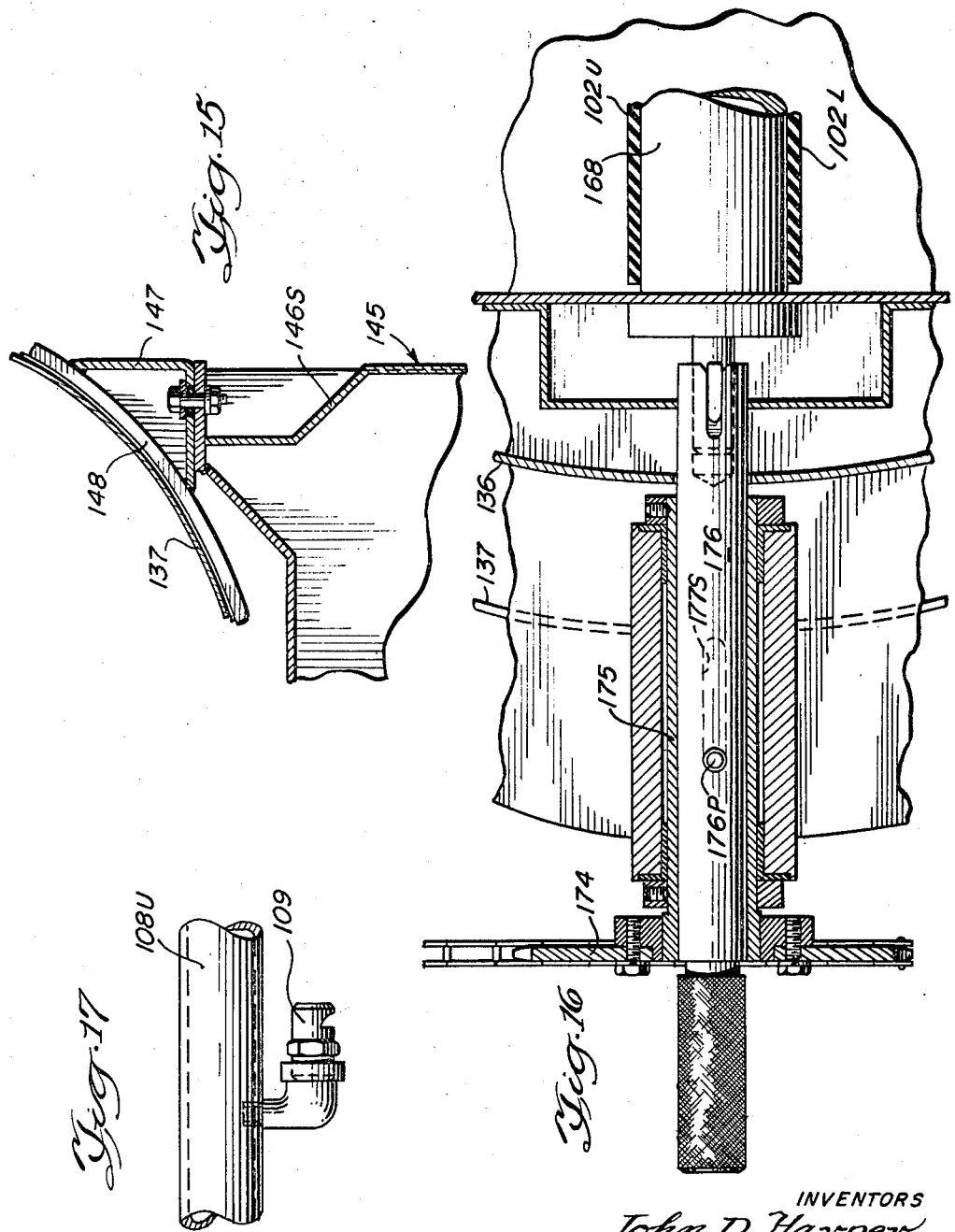

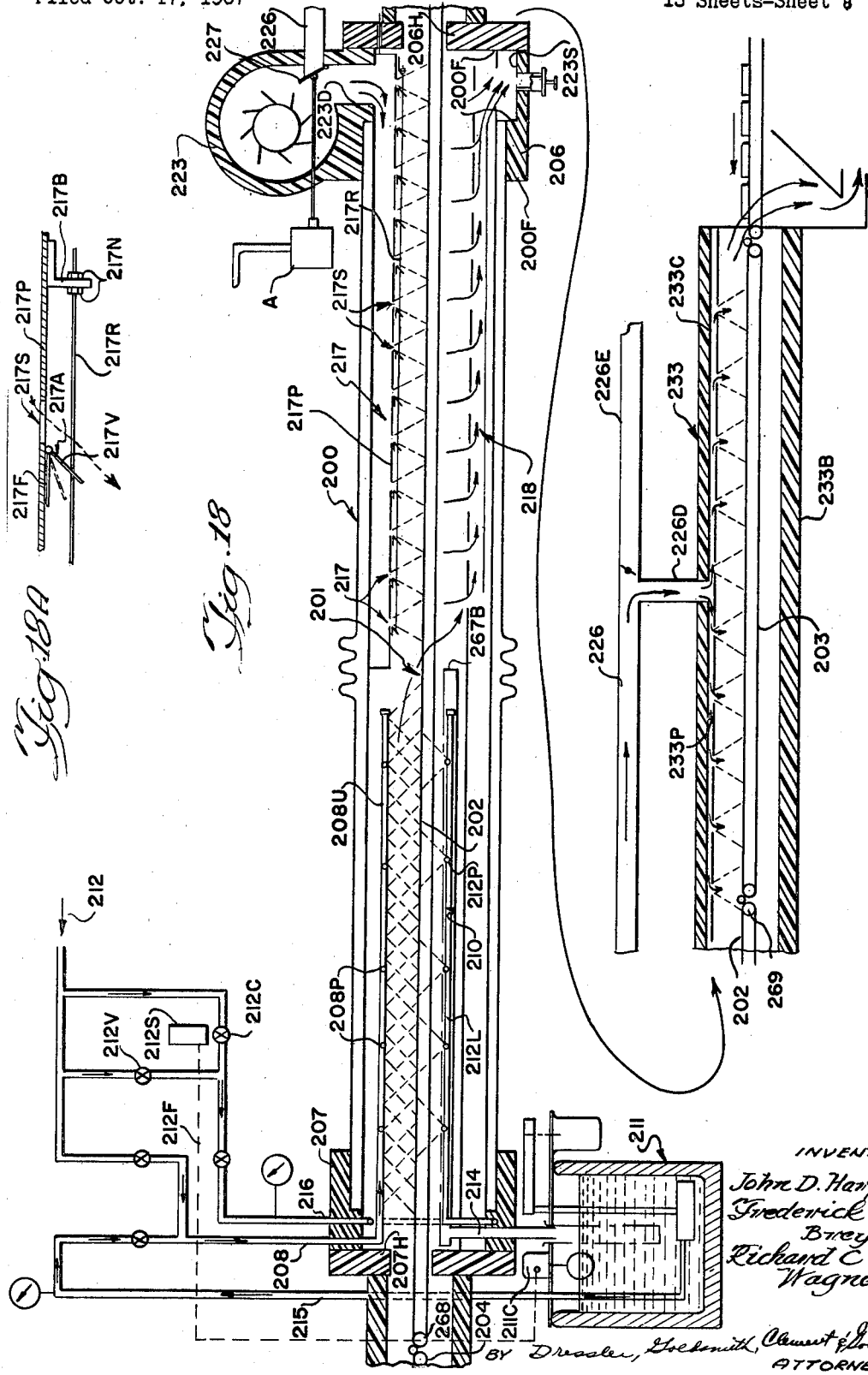

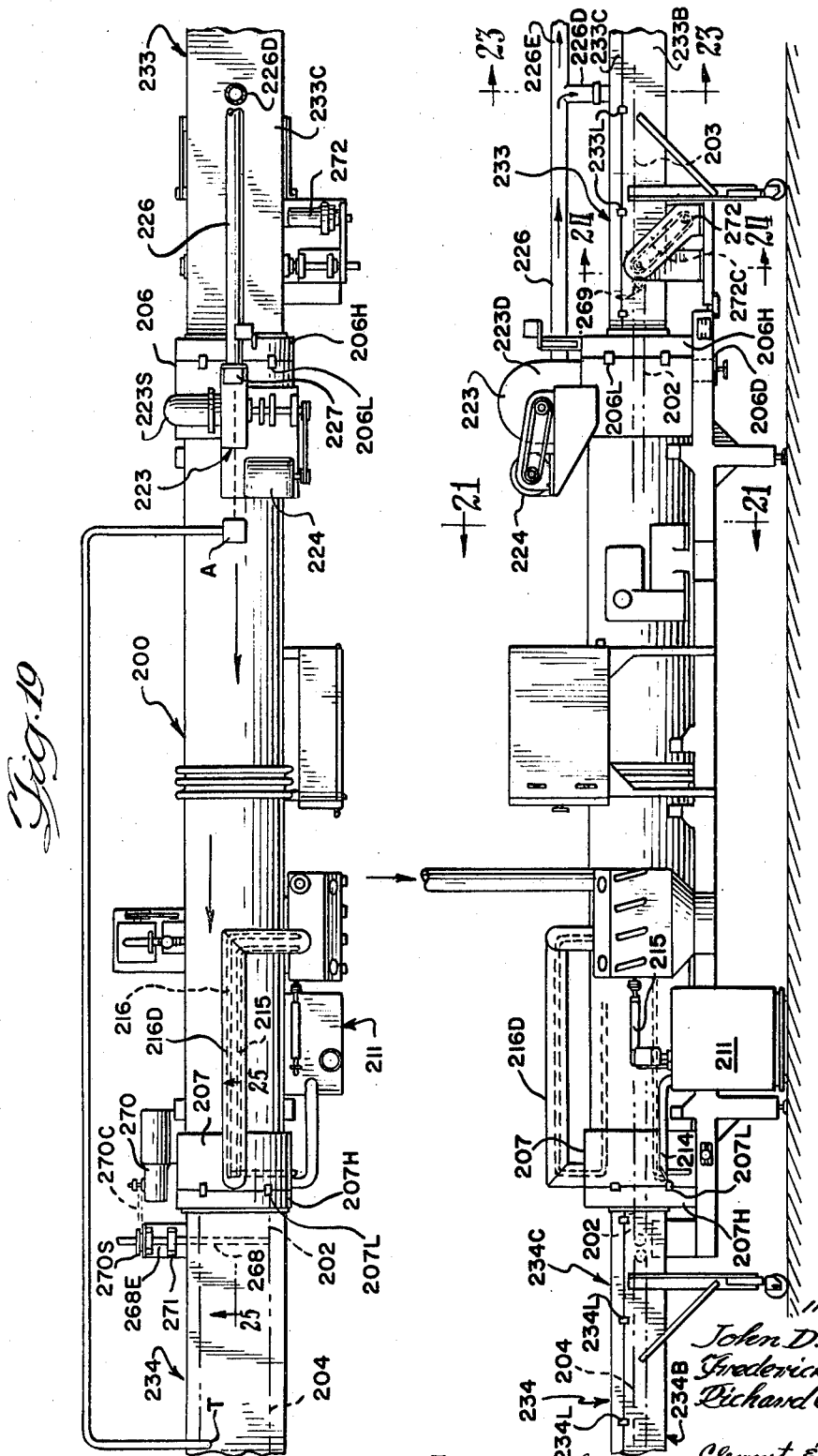

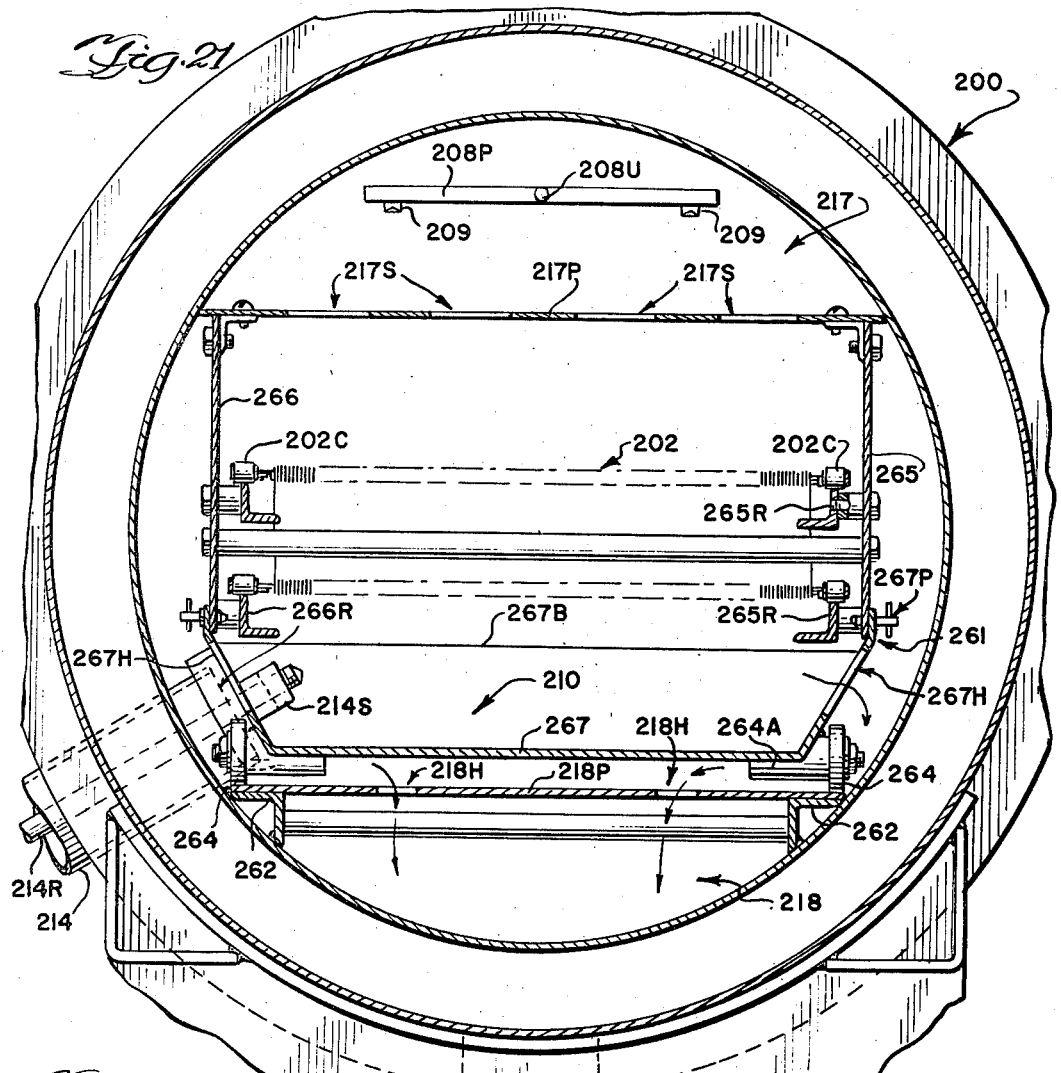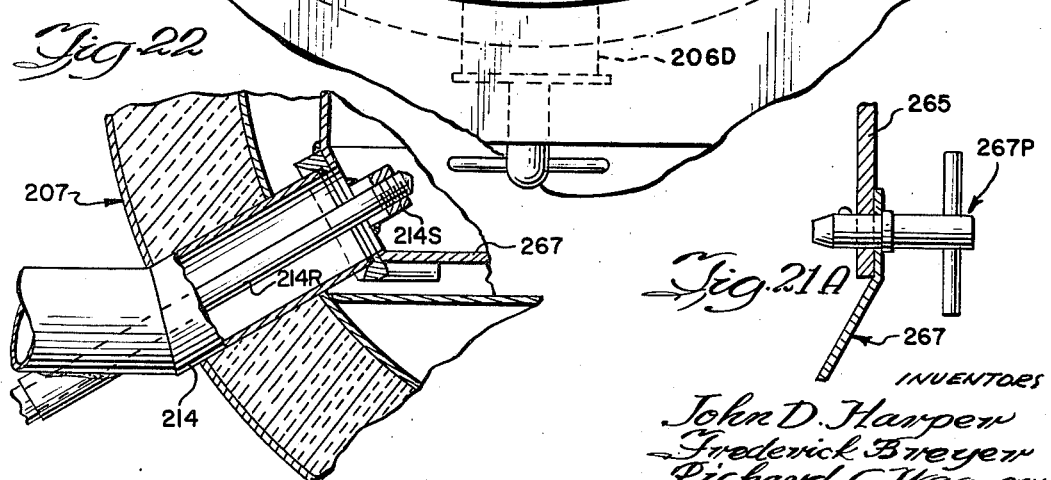

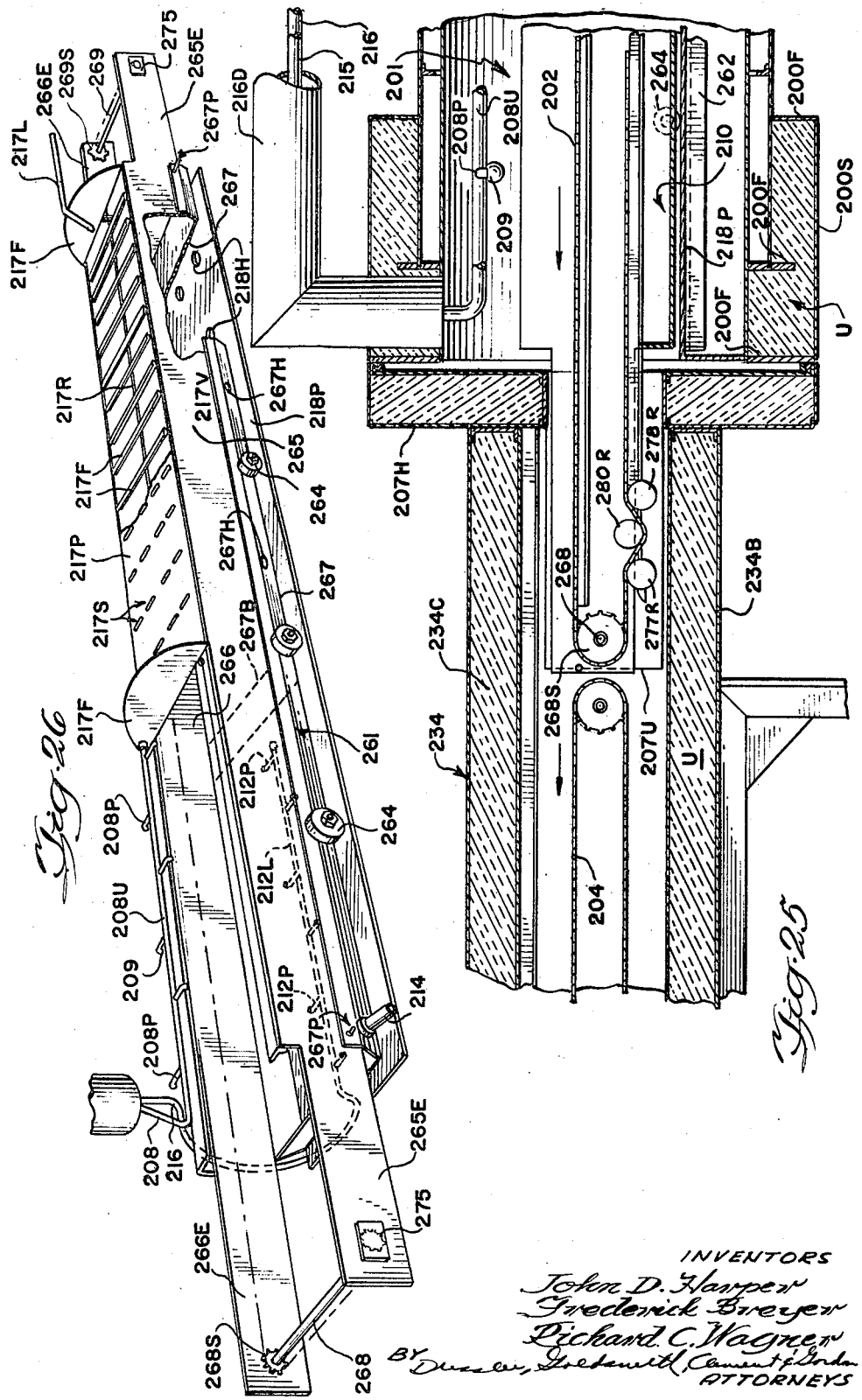

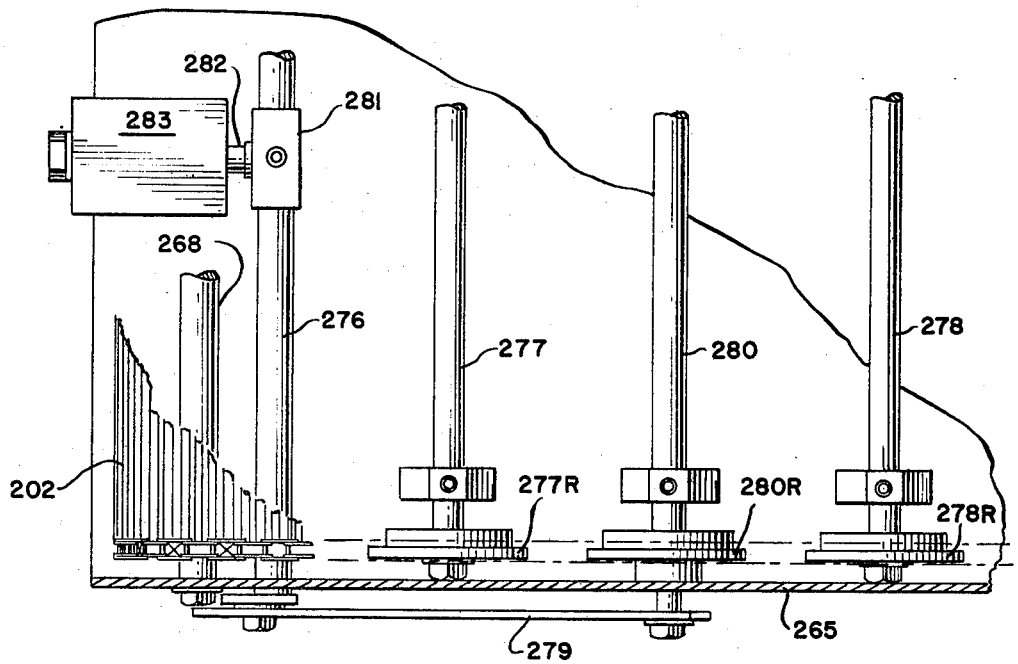
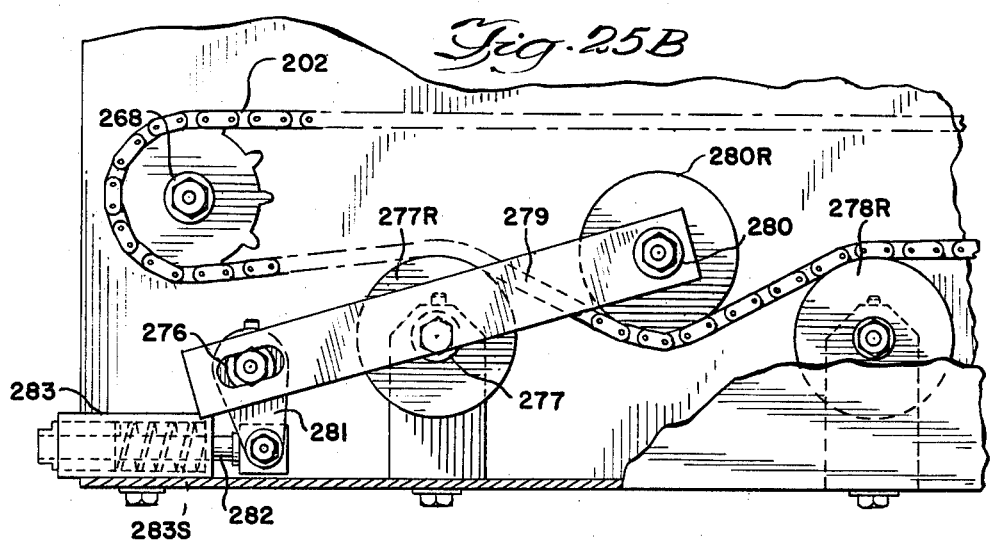

United States Patent Office 3,494,140
Patented Feb. 10, 1970

3,494,140
LIQUID NITROGEN FLASH FREEZING
John D. Harper, Elgin, Frederick Breyer, Highland Park, and Richard C. Wagner, Clarendon Hills, Ill., assignors to Integral Process Systems, Inc., a corporation of Illinois
Continuation-in-part of application Ser. No. 487,359, Sept. 15, 1965, now Patent No. 3,431,745, dated Mar. 11, 1969. This application Oct. 17, 1967, Ser. No. 675,890
Int. Cl. F25d *13/06, 3/10, 17/02*
U.S. Cl. 62—190                             22 Claims

ABSTRACT OF THE DISCLOSURE

Cryogenic flash freezing apparatus is disclosed using vacuum insulated outer and inner shells defining a main process chamber equipped wih an upstream cryogenic gas recirculation system that impinges vertically on the product and a downstream cryogenic liquid spray system having continuous liquid recirculation and controlled introduction of make-up liquid through a bottom header of the spray system to compensate for gas discharging from the apparatus. A removable support structure in the main process chamber is removable endwise and includes a trough-shaped bottom pan having removable pivot pins supporting an overlying superstructure that includes outboard end extensions. A main conveyor belt is mounted on the superstructure and is easily cleaned. Insulated entrance and exit ducts each equipped with a separate conveyor are provided for the main process chamber and are provided with balanced gas exfiltration flows by automatic and manually adjusted gas flows.

---

This application is filed as a continuation-in-part of our copending application Ser. No. 487,359, filed Sept. 15, 1965, now Patent No. 3,431,745, issued Mar. 11, 1969.

This invention relates to a method and apparatus for freezing both food and non-food products by the use of the latent heat of vaporization of liquid nitrogen and the specific heat of ultra-cold nitrogen gas. The application of the instant invention is particularly directed to the flash freezing of foods, which is by way of example only.

The present freezing methods, including blast freezing and immersion freezing techniques, are subject to many disadvantages including inefficiency of operation, length of time required to satisfactorily freeze the products, and the cost factor. In addition, the present methods are limited as to the amount of product that can be frozen in any given time period. A contributing factor to the reduction in efficiency is the lack of adequate insulation to permit maximum utilization of the fluid being used as the cooling medium. Heretofore, conventional insulating techniques have not been completely satisfactory and have substantially added to the cost of the coolant used.

Other problems encountered when employing the "blast freezing" method include the change in crystalline structure and the disturbance of the quality of the food product.

It can be appreciated that a system whereby food products can be instantaneously frozen in a continuous process at a price that would be economically feasible would be a boon, both to the food processor and the consumer who would like to have food products always available regardless of the season of the year.

In accordance with the present invention, there is provided a method and apparatus for the efficient and economical "instant freezing" of various products including those frozen foods presently available on the market. Other products would include meat, poultry, sea food, bakery products, and prepared foods. Examples of other uses for which the process may be utilized include the shrink fitting of bearings and the stress relieving of aluminum castings.

The method of this invention in one aspect thereof involves flash freezing of articles in a substantially thermally isolated chamber and includes the steps of transporting the articles along a process path into, through and out of said chamber, directing a cryogenic liquid spray discharge on each article to flash partly to gas, collecting excess liquid from the discharge and supplementing the same with make-up liquid to replace the liquid flashing to gas, recirculating the liquid nitrogen to support the spray discharge and drawing off gaseous nitrogen from the chamber and returning the same to the chamber in the form of a high velocity stream directed along a recirculation flow path to impinge upon articles when at another region along the flow path.

The method utilizes the latent heat of vaporization for the final freezing phase, and first precools with high velocity gaseous nitrogen in preparation for the final freezing phase. In one embodiment, the gaseous nitrogen is presented in two stages, the first involving a transverse gas stream at about —100° F. and the second involving an oppositely directed transverse gas stream at about —200° F. In another smaller embodiment, a single direction transverse gas stream is employed.

In the flash freezer embodiments disclosed herein, a vacuum is maintained in an annular zone defined between inner and outer shells. The outer shell has a flexible joint intermediately therealong and is connected to the ends of the inner shell to follow thermally induced lengthwise contractions and expansions of the inner shell. Insulated end spools are mounted on the shells and arranged to receive all external fluid connections to the equipment.

Facilities for recirculating liquid are located externally and extend through one of the insulated end spools. Facilities for recirculating cold gas are also located externally and extend through the insulated end spools.

Internal support structure is removable endwise from the process chamber to facilitate construction, assembly and maintenance. This support structure mounts plenum chambers for the gas recirculation system, the plenum chambers being arranged for quick connection to gas outlets and inlets provided in the end spools. A main open mesh conveyor is mounted on the removable support structure and liquid supply headers and nozzles are mounted to spray through the conveyor.

Inlet and outlet tunnels lead to and from opposite ends of the conveyor and are themselves equipped with conveyors for advancing the articles to be treated. Each of these tunnels is subjected to a gradual exfiltration of gaseous nitrogen to effect desirable pre-freezing and post-freezing cooling treatments.

Other features and advantages of the invention will be apparent from the following description and claims, and are illustrated in the accompanying drawings which show an illustrative embodiment of the present invention.

In the accompanying drawings forming a part of the specification, and in which like numerals are employed to designate like parts throughout the same, FIG. 1 is a diagrammatic plan sectional view through the complete apparatus;

FIG. 2 is a fragmentary lengthwise section through the downstream end of the apparatus;

FIG. 3 is a transverse section through the inlet end spool of the process chamber structure;

FIG. 4 is a plan view of the entire apparatus;

FIG. 5 is a side elevational view of the entire apparatus;

FIG. 6 is a plan sectional view of the entire apparatus;

FIG. 7 is a lengthwise transverse sectional view of the entire apparatus;

FIG. 8 is an enlarged transverse section better illustrating internally mounted removable support structure;

FIG. 9 is a diagrammatic side elevational view illustrating removal of the internal support structure;

FIG. 10 is a plan view of the main shell and end spool framing at an intermediate stage of construction;

FIG. 11 is a transverse section taken on the line 11—11 of FIG. 10;

FIG. 12 is an enlarged fragmentary section through the end spool and is taken on the line 12—12 of FIG. 11;

FIG. 13 is a related section through the spool and is taken as indicated on the line 13—13 of FIG. 11;

FIG. 14 is an enlarged fragmentary section of a flexible joint provided in the main housing;

FIG. 15 is an enlarged fragmentary section of a shell support stand;

FIG. 16 is an enlarged section of a drive shaft connection to the main conveyor;

FIG. 17 is a fragmentary elevational view of a liquid supply header and spray nozzle;

FIG. 18 is a schematic lengthwise sectional view illustrating another embodiment of the invention;

FIG. 18A is an enlarged fragmentary sectional view taken on the line 18A—18A of FIG. 18;

FIGS. 19 and 20 are general views corresponding to FIGS. 4 and 5, respectively, and illustrating another embodiment of the invention;

FIG. 21 is a transverse section through an upstream region of the process chamber and is taken on the line 21—21 of FIG. 20;

FIG. 21A shows a detail of a quick disconnect pivot pin used in the invention;

FIG. 22 is a fragmentary detail sectional view illustrating a liquid drain line arrangement;

FIG. 25 is a fragmentary lengthwise section taken on the line 25—25 of FIG. 19;

FIGS. 25A and 25B are fragmentary plan and side elevational views, respectively, showing conveyor belt take-up mechanism used in the practice of the invention; and FIG. 26 is a perspective view of the removable support structure utilized in the process chamber.

Figure 23:
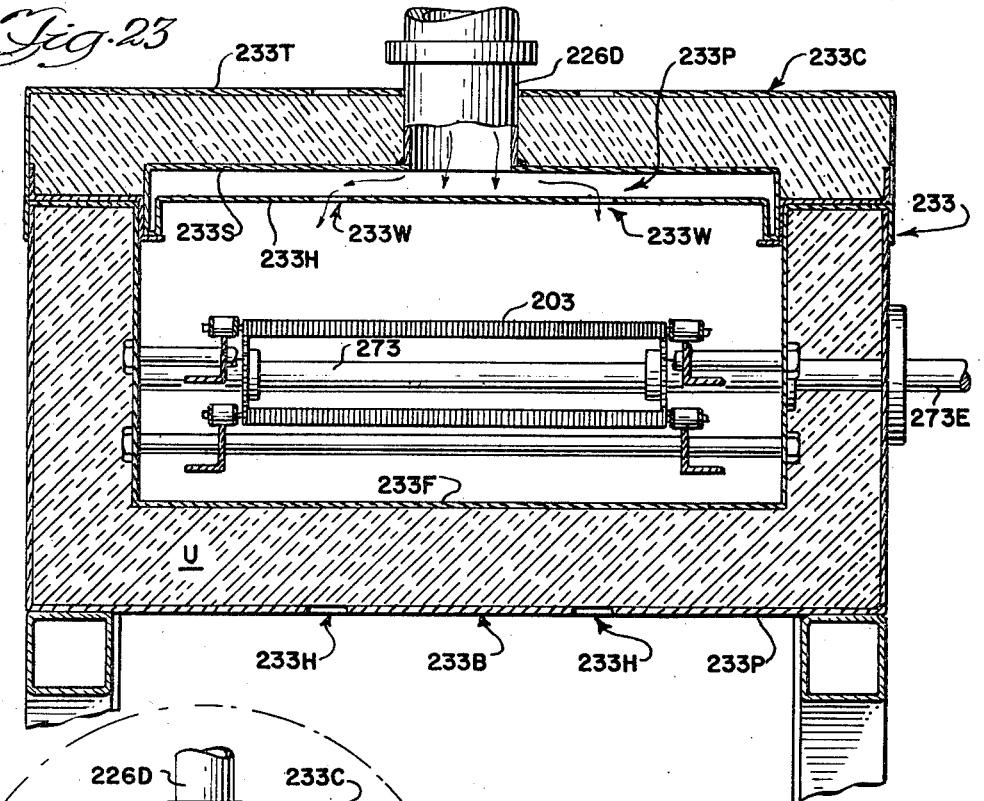
FIG. 23 is an enlarged transversed section through the entrance tunnel and is taken on the line 23—23 of FIG. 20.
Figure 24:
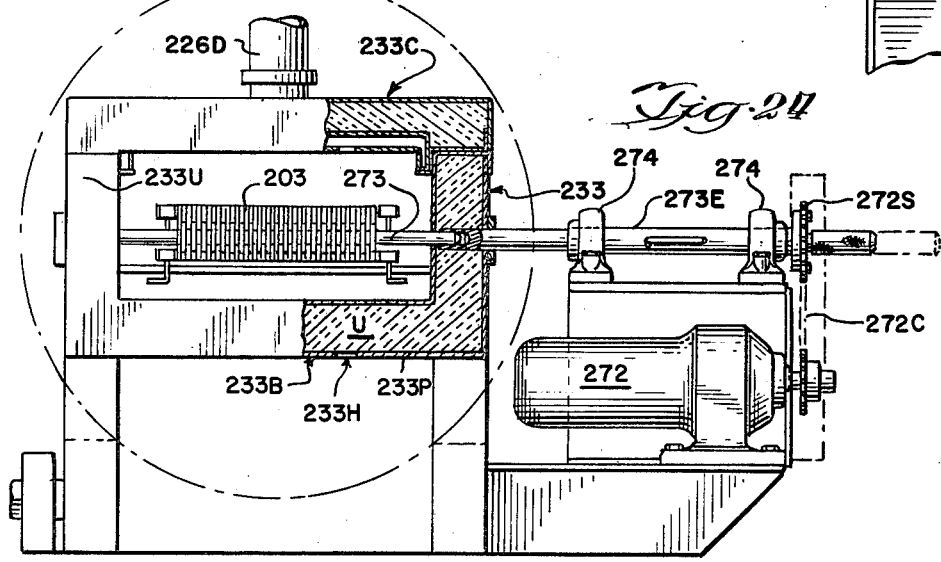
FIG. 24 is another transverse section through the entrance tunnel and is taken on the line 24—24 of FIG. 20.

A flash freezing liquid nitrogen system together with typical flow rates and temperatures is provided in diagrammatic FIGS. 1 to 3 for purposes of illustrative discolsure. More structural features of the system are shown in greater detail in FIGS. 4 to 17. A related embodiment incorporating certain improvements is illustrated in FIGS. 18 to 26.

Referring now particularly to the diagrammatic views of FIGS. 1 to 3, the system includes hollow housing structure 100 defining a substantially thermally isolated process chamber 101 having a conveyor 102 extending substantially full length therein and operating at a predetermined speed to advance products along a process path that leads through the process chamber in a direction from right to left as viewed in FIG. 1. An in line entrance conveyor 103 is shown leading into the process chamber at the right in FIG. 1 and an in line exit conveyor 104 is shown leading from the process chamber at the left in FIGS. 2 and 3. The housing structure 100 is configurated to present an annular insulation space 105 completely encircling the process chamber and normally maintained at a vacuum level of less than 10 microns of mercury.

At the product infeed end, the housing structure is terminated in an insulated entrance spool 106 having a restricted mouth through which the entrance conveyor 103 extends and at the product delivery end, the housing structure is terminated in an insulated exit spool 107 having a restricted mouth through which the exit conveyor 104 extends.

Spray discharge mechanism as provided in this embodiment, includes a cryogenic liquid supply line 108 feeding an upper pair of headers 108U and a lower pair of headers 108L arranged adjacent the downstream end of the process chamber and occupying about ⅓ of the length of the process chamber. A set of seven spray nozzles 109 (see FIG. 17) are shown on each header, each issuing a wide angle hollow cone, solid, or fan spray discharge. The precise number of nozzles per header can be varied depending upon the product to be frozen. The nozzles associated with the upper headers 108U are directed vertically downwardly and the nozzles associated with the lower header 108L are directed vertically upwardly. The spray patterns, as shown in FIGS. 1 and 2, are in a staggered alternating close fit relation to span the entire width of the conveyor and progressively deposit atomized liquid droplets substantially uniformly against both the top and bottom faces of the articles. The conveyor 102 is of open mesh construction enabling necessary flowthrough for the upwardly directed nozzles associated with the bottom header. One of the features of the arrangement is the use of mass flow rates of cryogenic liquid substantially in excess of the mass rate at which liquid flashes to nitrogen within the chamber. The excess liquid emitted by the spray discharge is collected in a pan-shaped reservoir or tray 110 which underlies the conveyor 102 and the headers 108U and 108L adjacent the downstream end of the process chamber.

An arrangement for recirculating excess liquid to sustain the prescribed higher spray discharge rate is provided externally and includes a dewar 111 or other vacuum insulated vessel providing a sump for cryogenic liquid, a cryogenic pump 112 suspended in submerged relation in the cryogenic liquid in the dewar, a drive motor 113 mounted externally of the dewar and having a drive belt 113B connected to the exposed upper end of the pump drive shaft 112S. The pump 112 is illustrated as being of a centrifugal type and further particulars of its arrangement and construction are provided in a copending application entitled Cryogenic Pump, Ser. No. 479,825, filed Aug. 16, 1965, in the name of Richard C. Wagner. The disclosure of said application is specifically incorporated herein by this reference.

To complete the liquid recirculation system a drain line 114 leads from the collector pan 110 to the sump to return unused cryogenic liquid and a delivery line 115 leads from the discharge side of the pump and connects to the supply line 108 to the headers. The amount of liquid flashing to gas is related to the product flow rate through the process chamber and this amount must be constantly made up in order to sustain the spray discharge flow rate. A line 116 is shown which leads from a cryogenic liquid supply tank (not shown) exterior to the system, the line 116 having a solenoid control valve 116V and extending through the exit spool 107 to open directly into the collector pan 110 for supplying the make-up liquid. Since the pressure at this external source and acting in the line 116 is normally greater than the pressure acting on the headers, the release of the make-up liquid is accompanied by more pronounced flashing to vapor. The latent energy release associated with the pressure transition at the point of liquid release and evidenced by direct flashing to vapor is utilized in the present arrangement by connecting the make-up line 116 to empty at a point directly within the process chamber.

The process chamber 101 is shown provided with internal housing structure to define a first set of opposed transversely spaced high pressure and low pressure plenum chambers 117 and 118, respectively, adjacent and flanking the process path along the upstream end of the process chamber and a second set of opposed transversely spaced high pressure and low pressure plenum chambers 119 and 120, respectively, adjacent and flanking the process path along an intermediate region of the process chamber. In the case of the upstream set, the high pressure chamber 117 is provided with an array of individually mounted control nozzles, as represented at 117N, and the low pressure chamber 118 is provided with a corresponding array of receiver openings 118R collectively to define a gas recirculation flow path that is oriented substantially transversely of the upstream end of the process path, as represented by the flow arrows 121. Correspondingly, the high pressure chamber 119 of the intermediate set is provided with an array of individually mounted control nozzles, as represented at 119N, and the low pressure chamber 120 is provided with a corresponding array of receiver openings 120R which define a gas recirculation flow path also oriented approximately transversely of the process path but moving in an opposite side to side direction, as represented by the flow arrows 122, to provide impingement against an opposite region of the articles as they progress along the process path.

A gas recirculation system is associated with the entrance spool 106 and includes an externally mounted fan 123 powered by a drive motor 124 and having a discharge conduit 123D extending laterally through the wall of the spool immediately adjacent the end of the hollow housing structure 100 and a suction conduit 123S which, as best shown in FIG. 9, extends partway internally of the spool 106 and emerges laterally at a lower elevation. It will be noted that the discharge conduit 123D from this gaseous recirculation system branches to feed an exhaust conduit 126 that is equipped with a damper type control valve 127 to relate the rate of release of exhaust gas to the rate at which liquid flashes to gas within the process chamber for maintaining desired temperature and pressure balance within the system. In the disclosed arrangement, the process chamber is maintained substantially at atmospheric pressure and the control of the exhaust rate may be accomplished either by regulating with pressure as a reference, though this requires unduly sensitive equipment, or by regulating with temperature as a reference.

A corresponding gas recirculation system is provided at the discharge end of the process chamber and includes an externally mounted recirculation fan 128 powered by a drive motor 129 with the fan having its discharge conduit 128D entering laterally through the exit spool 107 and having its suction conduit 128S arranged partly in the spool and existing at a lower elevation.

The plenum chambers 119 and 120 which constitute the intermediate set have masked wall regions 119W and 120W flanking the liquid spray discharge area and opening into the exit spool 107 to communicate with the discharge and suction conduits from the fan 128. Similarly, the plenum chambers 117 and 118 of the upstream set open into the entrance spool 106 and communicate with the discharge and suction conduits of its recirculation fan 123.

A high velocity gaseous curtain is provided across the mouth of each spool 106 and 107 by arranging the opposite internal face portions of each spool with suitable opposed openings to effect a continuous gas flow pattern directed laterally adjacent to the mouth region. These curtains serve to exclude ambient atmosphere from the process chamber and they are particularly effective where the process chamber is operating at or near atmospheric pressure.

In the arrangement as shown in FIGS. 1 to 3, the fact that gaseous nitrogen is withdrawn upstream, through the exhaust conduit 126 at the inlet end, and the fact that fresh gaseous nitrogen is introduced downstream, by virtue of the liquid flashing to gas at this region, results in a temperature profile wherein heat exchange between the cryogenic fluid and the product is optimized. In general, arrows 131 adjacent the upstream end of the spray discharge pattern indicate the manner in which the freshly released gas joins in the transverse flow pattern developed by the intermediate set of plenum chambers 119 and 120. Arrows 132 bridge the high pressure chamber 119 of the intermediate set with the low pressure chamber 118 of the upstream set so that there is a gradual transfer of gaseous nitrogen towards the upstream end of the process chamber.

Optimum heat transfer is effected because the product, when at its warmest state, is exposed to gas at its warmest state within the system; the product when partially cooled is exposed to colder gas; and the product when further cooled is exposed to cryogenic liquid to complete the process.

For purposes of illustrative disclosure, typical values are given for operating the flash freezer apparatus in a practical application involving flash freezing of bakery goods at a rate of 2500 lbs. per hour. The delivery line 115 from the cryogenic pump 112 handles a rated flow of 5100 lbs. per hour of cryogenic liquid supplied at a pressure of 6 p.s.i. to be spray discharged in distinct wide angle spray patterns by the precision nozzles 109 which, by way of example, may have a 1/8" diameter orifice and be of the type identified as No. 1/8B5–5W of Spraying Systems Co.

For bakery goods, the system utilizes about one pound of liquid nitrogen for each pound of product. In the example, 2500 pounds of product are processed per hour so liquid flashes to gas at the spray discharge region at a rate of about 2500 pounds per hour. The excess is collected in the tray 110 and is drained back to the sump provided by the external dewar 111. Fresh liquid nitrogen is supplied through the make-up line 116 which enters through the exit spool 107 and opens directly into the tray 110. The average rate of make-up liquid entry is therefore 2500 pounds per hour, and this liquid also drains into the sump after its release at a point within the chamber.

The temperature of the entering cryogenic liquid is about —320° F. The flow volume of the gas recirculation stream between the intermediate set of plenum chambers 119 and 120 is about 1000 cubic feet per minute and the gas temperature is about —200° F. The gas recirculation fan 123 for the upstream set of plenum chambers 117 and 118 has a flow volume of 1000 cubic feet per minute and at this region the gas is at a temperature of —100° F. A typical value for the drawoff through the exhaust conduit 126 is about 390 cubic feet per minute at a temperature of —100° F. The stream velocity across the intermediate set of plenum chambers is 2000 feet per minute and the stream velocity across the upstream set of plenum chambers is somewhat less. The total mass flow rate of the gas in these transverse flow streams is substantially greater than the mass rate of liquid flashing to gas in the chamber.

The high volume, high velocity gas recirculation creates turbulence at the surface of the product or article and effects better heat transfer. Transverse flow is more efficient as it is easier to achieve high volume and high velocity and it affords a better angle of impingement upon the product.

In the disclosed embodiment, liquid nitrogen is pumped to the spray headers 108U and 108L in a saturated liquid state (all liquid and no gas); the amount of liquid nitrogen sprayed on the product is in excess (two to three times as much) of what is actually required to freeze the product; and the excess amount is collected and recirculated back to the spray headers. The spray technique used progressively and repeatedly wipes the surface of the product with liquid nitrogen droplets to promote rapid heat transfer. The gas generated on the surface of the product in the freezing process is penetrated by the liquid nitrogen droplets which leave the spray nozzles with adequate velocity for this purpose.

An accurate metering of liquid nitrogen to the system is not required. The liquid nitrogen level in the exterior sump provided by the dewar 111 is controlled by a simple on-off liquid level controller 111C. As liquid nitrogen is consumed in the freezing process, the level of liquid in the sump will drop and additional liquid is added to the system. Without a liquid recirculating system such as disclosed herein, the precise amount of liquid nitrogen must be added to perform the freezing operation. If an excess is added, inefficient operation will result. If too little is added, the product will not be properly frozen. The progressively deposited full coverage high velocity spray technique results in very rapid heat transfer between the product and the liquid nitrogen. This results in high production for a relatively small unit. Since the heat transfer loss from a freezer unit to the surrounding atmosphere is a relatively fixed amount for a given size unit, the unit with the higher production rate can prorate this loss over a large amount of product processed.

The entrance and exit conveyors 103 and 104 are housed in insulated ducting providing an entrance tunnel 133 and an exit tunnel 134. Each of these tunnels angles upwardly in a direction away from the process chamber and is maintained filled with cold gaseous nitrogen (which is much denser than ambient air). The process chamber is operated at slightly greater than atmospheric pressure to promote flow or exfiltration of gaseous nitrogen outwardly through each tunnel. This exfiltration is arranged effectively to exclude entry of ambient air and also provides pre-cooling in the case of the entrance tunnel 133 and post-cooling in the case of the exit tunnel 134. The product which has just been deeply frozen by the liquid nitrogen at the downstream end of the process chamber 101 may achieve thermal equilibration during the post-cooling process in the exit tunnel.

The nozzles 117N and 119N are individually rotatable structures to give some axial adjustment of the direction path of the recirculated gaseous stream. By proper adjustment of these nozzles, the exfiltration flows through the tunnels may be balanced or may be otherwise set up according to individual needs.

The structural features incorporated in the flesh freezer apparatus are best disclosed in FIGS. 4 to 17, and reference may now be had to these figures of the following description.

The hollow housing structure 100, which defines the process chamber 101, is comprised of substantially co-extensive inner and outer shells 136 and 137, respectively, which are mounted in a spaced apart relation to define the annular insulation space 105 which is maintained at the prescribed vacuum by means of the vacuum pump 138 (FIG. 5). The vacuum pump 138 is powered by a motor 139 and has its suction line 140 connected through an elbow 141 which is mounted on the outer shell 137 to communicate with the vacuum space 105.

The inner shell 136 is a unitary, rigid, one piece structure and is subjected to the widest range of temperature extremes and undergoes contraction and expansion each time the unit is started up or turned down. The outer shell 137 consists of endwise aligned sections joined together at an intermediate point by an endless, flexible joint 142 and connected at opposite ends 137E (FIGS. 12 and 13) to corresponding ends 136E of the inner shell by means of an annular flange 143. Reinforcement rings 144 of right angled section are secured to each section of the outer shell 137 at axially spaced locations to rigidify it, with the inner radial extremities of the reinforcement rings 144 being spaced from the inner shell 136 to maintain the insulation effectiveness of the vacuum and to maintain the vacuum space 105 continuous and uninterrupted from end to end of the hollow housing structure 100. The entire arrangement of the flash freezer apparatus eliminates connections leading externally through the vacuum space 105, and this greatly contributes to the effectiveness of the insulation arrangement, and also avoids the difficult mechanical construction problems associated with the relative axial shifting that occurs between the inner and outer shells.

As is apparent in FIGS. 5 and 7, a set of four stands 145 underlie the outer shell in axially spaced relationship, two for each end section. The details of these stands 145 are shown more clearly in FIGS. 8 and 15 and each includes a floor-mounted base structure 146 having upstanding sides 146S, each equipped with an angle iron mounting bracket 147. The brackets 147 are in an opposed relationship to each other and jointly carry an arcuate support shoe 148 having an underslung supporting relation to the outer shell 137 and providing a broad faced support surface that facilities the sliding movement of the outer shell as it follows changes in length of the inner shell occasioned by temperature effects.

The end spools 106 and 107 are essentially similar and each is comprised of skeletal metal framing including, as is best seen in FIG. 12, an internal sleeve 149 for endwise registry with the inner shell 136 and of the same diameter, and axially spaced outer and inner flanges 150 and 151. The skeletal framing consituted by the elements 149, 150 and 151 is insulated by encircling it with a thick packing of polyurethane foam 152, which extends radially beyond the flanges 143 and 151. These flanges 143 and 151 are interconnected for joining the spools to the hollow housing structure. The foam packing 152 is extended axially along the outer skin of the outer shell 137 to limit the temperature gradient at this region of the insulation system. The insulation foam is covered by an annular shell 153 of stainless steel or of fiberglass and coated with a polyester.

As is best seen in FIGS. 3, 11 and 13, each of the spools has its sleeve 149 provided with diametrically opposed wall openings 154 and 155. Wall opening 154 mounts an adaptor duct 156, which serves as an extension of the pressure passage 123D or 128D of the corresponding gas recirculation system. Wall opening 155 has an adaptor duct 157 which leads arcuately around the spool within the confines of the layer of insulation 152 and emerges at a laterally lower elevation as an extension of the suction passage 123S or 128S of the corresponding gas recirculation system.

Finally, each of the end spools 106 and 107 receives an end closure cap 158 having a restricted central opening serving as the mouth of the spool. The end closure cap 158 is in each case insulated with a packing of polyurethane foam. The end caps are mounted from swing rods including vertical and horizontal sections 159 and 160 to enable convenient removal of the end cap for gaining access to the interior of the process chamber 101.

Removable support structure, as designated generally at 161 in FIGS. 6 to 9, extends endwise in the process chamber 101. In the disclosed arrangement, the inner shell 136 is equipped with fixed lengthwise rails 162 interconnected by reinforcing bars 163 and providing trackways for flanged mounting wheels 164 carried on opposite underneath sides of the removable support structure 161. The removable support structure 161 includes upstanding side panels 165 and 166 extending substantially its full length and interconnected by a number of transverse bars 167.

The collector tray 110 is best shown in FIG. 8. It includes a trough-shaped bottom 110B and a perforated screen 110S spaced thereabove. The main conveyor 102 has upper and lower reaches 102U and 102L, respectively and is powered by a drive roller 168 at its downstream end and is trained about an idler roller 169 at its upstream end, with the conveyor being nested centrally in the removable support structure. Ducts 170 and 171 are mounted outward on the sidewalls 165 and 166 to define the plenum chambers 117 to 120, there being a vertical baffle 170B and 171B separating these chambers longitudinally.

Finally, in the detailed structural embodiment of FIGS 4 to 17, a set of three upper headers 108U are shown equipped with nozzles 109 and a set of three lower headers 108L are shown equipped with nozzles 109, these headers being suspended by hooks 172 that are mounted to the transverse bars 167. A header 108U and nozzle 109 is shown in greater detail in FIG. 17.

The wheeled mounting of the removable support structure 161 enables that entire subassembly to be withdrawn endwise from the process chamber. A support dolly 173 is shown underneath one end of this removable structure in FIG. 9 to illustrate its removal from the process chamber. Preliminary to this removal, the corresponding tunnel and transfer conveyor must be physically cleared from the path. The end cap 158 on the spool must be removed and the main conveyor 102 must be disengaged from its drive which is shown in FIGS 6 and 16. In particular, the drive is shown as including a sprocket 174 carrying a fixed sleeve 175 to mount a shaft 176 for axial shifting movement for effecting engagement and disengagement with the drive roller of the conveyor. The limits of movement are determined by a pin 176P carried in the shaft and acting in sleeve slots 177S. When the shaft is retracted, its socketed connection end is outboard of the removable support structure to provide required clearance for endwise shifting of the same. It will also be noted that the outboard mounted ducts 170 and 171 have flanged entry ways 170E and 171E at each side at opposite ends to effect quick connection and disconnection with the ducts 157 and 156 in the spools. The headers 108U and 108L which receive the liquid nitrogen may also have a quick mechanical disconnection provision so that withdrawal of the equipment and cleaning is greatly facilitated.

Another embodiment of the invention is illustrated generally in the schematic view of FIG. 18 and in the generalized views of FIGS. 19 and 20 and, in general, reference characters in the 200 series are employed to designate elements of this structure that correspond to the previous embodiment. Thus, this embodiment employs hollow housing structure 200 defining a process chamber 201 having an open mesh stainless steel main conveyor 202 operating therein at a predetermined speed to advance products along a process path leading therethrough in a direction from right to left as viewed in FIGS. 18, 19 and 20. Entrance and exit open mesh stainless steel conveyors 203 and 204, respectively, lead to and from the process chamber.

At the entrance end, the vacuum insulated housing structure 200 is terminated in a spool 206 having a restricted mouth through which one end of the main conveyor 202 projects. Correspondingly, the exit end of the housing 200 is terminated in an exit spool 207 having a restricted mouth through which the other end of the main conveyor 202 projects.

Spray discharge mechanism, as provided in this embodiment, includes a cryogenic liquid supply line 208 supplying an upper header 208U arranged adjacent the downstream end of the process chamber and equipped with a set of alternating branch pipes 208P (see FIG. 26), each equipped with a downwardly directed spray nozzle at its free end. The spray mechanism includes a lower header 212L supplying cryogenic make-up liquid at a rate to compensate for the rate of vaporization of liquid to gas. The lower make-up header 212L has a set of alternating branch pipes 212P each equipped with a spray nozzle 209 at its free end. The nozzle carrying sections of the headers 208U and 212L are centered along a downstream region of the process chamber and are dead-ended at their upstream ends. The make-up liquid is normally supplied at a higher pressure than the recirculated liquid. Accordingly, throttling facilities (not shown) can be incorporated in the make-up liquid line 212 to reduce the supply pressure differential and different nozzle designs can be employed at the make-up nozzles carried on lower header 212L to limit the velocity of spray at these regions. One advantage of the direct spray entry of liquid against the product is that the liquid is brought into contact with the product when the liquid is at its coldest state. Another advantage is that the partial vaporization associated with the pressure drop at the make-up nozzle exits provides a cooling effect that acts directly within the process chamber.

A manually controlled bypass valve 212V (FIG. 18) is employed in the make-up liquid line and is initially adjusted to regulate the mass rate of liquid entry to be continuous at a rate slightly less than the rate of vaporization associated with the product load. Exact regulation of this relationship is difficult but the disclosed arrangement provides an effective approximation because the main liquid spray discharge is established and determined by the nozzles 209 while the make-up liquid spray discharge is continually metered at a manually selected rate. Variations in the rate of supply of the make-up liquid are controlled by an on-off control valve 212C actuated by a solenoid 212S connected to a control circuit 212F that is responsive to the liquid level in the dewar 211 as sensed by the float actuated level controller 211C associated with the dewar. Any variations in the make-up supply amount to only minor variations in the total liquid spray discharge and do not introduce serious over-freezing and under-freezing problems.

The embodiment of FIGS. 18 to 20 utilizes the feature of creating a mass flow rate of cryogenic liquid in excess of the rate of vaporization occasioned by thermal transfer with the product. The excess liquid emitted from the vertically discharging nozzles passes through the open-mesh conveyor 202 and is collected in a reservoir 210 located within a lower downstream region of the process chamber to underlie the lower header 212. Recirculation of the excess liquid is provided by an externally located liquid collecting and pumping apparatus 211 which is fed by a drain line 214 leading from the reservoir 210 and exiting through the exit spool 207. A liquid delivery line 215 leads from the liquid collecting and pumping apparatus 211 to the supply line 208 that leads through the top of the exit spool 207 to the header 208U. A make-up liquid line 216 which is an extension of the make-up line 212 that incorporates external bypass valving and throttling controls, as previously referred to, leads through the top of the exit spool to connect to the make-up liquid header 212L. Physically, the lines 215 and 216 are housed in a common duct 216D (see FIGS. 19 and 20).

The process chamber 201 is provided with removably mounted support structure 261 (see FIGS. 21 and 26) to mount the main conveyor 202 and to define a set of transversely spaced high pressure and low pressure plenum chambers 217 and 218, respectively, adjacent and flanking the process path along the upstream end of the process chamber. The high pressure chamber 217 is at the upper region of the process chamber overlying the conveyor 202 and the low pressure chamber 218 is at the lower region of the process chamber underlying the conveyor 202 and underlying the corresponding region of the removable support structure 261.

In this embodiment, the hollow housing structure 200 is equipped with fixed lengthwise rails 262 providing support for mounting wheels 264 carried on stub axles 264A secured at opposite underneath sides of the removable support structure 261.

The removable support structure 261 is in the form of a two piece assembly comprised of an elongated trough-shaped bottom pan 267 mounting an elongated endwise over-hanging superstructure serving as a conveyor frame. The superstructure is comprised of suitably cross braced vertical side panels 265, 266, each including end extensions 265E and 266E, respectively, arranged to extend through and beyond the spools 206 and 207 to mount a conveyor drive shaft 268 outboard at the downstream end and a conveyor idler shaft 269 outboard at the upstream end.

A set of four quick disconnect pivot pins 267P such as the type known as FASPIN No. D–4–2–T are employed in aligned pairs to secure opposite ends of the side wall flanges of the pan 267 to the side panels 265 and 266. To facilitate cleaning of the unit, the removable support structure 261 is withdrawn endwise from the process chamber as facilitated by the wheels 264 which are associated with the rails 262. With the support structure partly withdrawn in the fashion illustrated generally in FIG. 9, the pivot pins 267P are pulled at the exposed end to allow the pan 267 to be swung downwardly about the axis of the pivot pins 267P at the opposite end which is still supported from the rails 262 within the process chamber. Cleaning and washing of the pan is greatly facilitated by this means. Washing of the conveyor 202 is also greatly simplified.

The open-mesh conveyor 202 is of a type incorporating a roller chain structure 202C along each marginal edge to engage sprockets 268S and 269S carried on the conveyor shafts. Accordingly, guide rails 265R and 266R extend in fixed relation along the side panels to support the chain elements of the conveyor 202. An insert baffle 267B extends crosswise at an intermediate region of the trough-shaped pan 267 to define one extremity of the liquid collecting reservoir 210 which thus is constituted by the one piece formed plate, itself.

The upper plenum chamber 217 is defined by an upper plenum plate 217P mounted in straddling relation upon the side plates 265 and 266 to overlie the upstream region of the process chamber and having segment-shaped end flanges 217F to block end leakage from the upper plenum chamber. A gas inlet stub 223D leads through the entrance spool 206 to open into the upper plenum chamber 217 and the plenum plate 217P has a multiplicity of slot-like wall openings 217S distributed therealong for directing a gas recirculation stream generally downwardly towards products entering the process chamber on the belt conveyor 202. As shown herein for a plenum chamber of about 8 feet in length, there are provided 21 rows of slots arranged 4 slots in a row, each slot being about ⅜ inch by 2¼ inch, and the rows being spaced 4½ inches on center.

The lower plenum chamber 218 is defined by a lower plenum plate 218P which extends full length through the process chamber and seats upon the fixed rails 262 to seal across the lower region of the process chamber. A gas exit stub 223S leads through the entrance spool 206 to communicate with the lower plenum chamber 218. The lower plenum plate 218P has a multiplicity of wall openings 218H distributed throughout the first several feet at its upstream end for collecting and returning gas after article impingement travel in the vertical directed transverse gas recirculation stream that flows between the chambers 217, 218.

The flow of this gas stream across the process path is depicted by flow arrows in FIGS. 18 and 21. The flow leaves the upper plenum in a generally downward direction, impinges against the product and passes through the conveyor 202 and into the region of the trough-shaped pan 267. Side openings 267H are provided along the upstream region of the pan 267 to enable the gas stream to curl around and under the pan 267 to flow through the plate 218P and into the lower plenum 218.

It is advantageous to provide directional control of the recirculation stream so that it may be regulated to enter either directly vertical or partly upstream or downstream. As shown in FIG. 26, a separate vane 217V extends laterally in depending relation along the downstream edge of each wall opening 217S. Each vane is provided as the pivoted leaf of a piano hinge assembly 217A which includes a fixed leaf 217F that is tack welded to the underface of the plenum plate 217P. A common lengthwise shiftable control rod 217R pivotally connects to each vane 217V to control the angular position thereof in ganged relationship, thereby directing the incoming recirculation gas stream either partly upstream or partly downstream or directly vertical. The control rod 217R is carried in a depending bracket 217B provided on the plenum plate 217P adjacent its upstream end, with a pair of jam nuts 217N serving to accommodate adjustment and subsequent locking of the rod. An enlargement, shown in FIG. 18A, illustrates baffle vanes 217V swung towards an upstream edge of the wall opening 217S to effect a generally upstream gas entry flow path.

The gas recirculation system includes an externally mounted fan 223 powered by a drive motor 224 and having its discharge side connected to the inlet stub 223D for the upper plenum and having its suction side connected to the exit stub 223S from the lower plenum. The discharge side of the fan 223 communicates with an exhaust conduit 226 that is equipped with a damper type control valve 227 to relate the rate of release of exhaust gas to the rate at which liquid flashes to gas within the process chamber. A temperature sensing element T provided in the exit duct 234 to sense temperature of the gas at the product exit is connected to control a remote actuator A that determines the position of the damper valve 227 in a fashion to regulate discharge of gas so as to maintain the desired outlet temperature.

The entrance conveyor 203 is supported and housed in insulated ducting providing a precool entrance tunnel 233. The exhaust conduit 226 enters centrally through a stub duct 226D at the top of the tunnel 233 to supply cold gas into a head plenum 233P for maintaining a sub-zero temperature profile therealong. Desirably, the precool tunnel length is selected to achieve an entrance temperature of from —50° to 0° F., with the temperature progressively dropping to about —100° F. at the entrance to the process chamber 201. These values are subject to variation in accordance with the temperature of the entering product. The process chamber and the precool tunnel 233 are operated at a pressure slightly greater than atmospheric to promote regulated exfiltration flow of gaseous nitrogen outwardly through the precool tunnel, thereby excluding entry of ambient air. Additional precool tunnels may be provided where a longer precool run is desired. In these situations, an extension 226E of the exhaust conduit is provided to feed cold gas to each precool section.

The precool tunnel 233 utilizes a fabricated hollow walled construction adapted for filling with insulation that is foamed in place. Thus, the tunnel 233 comprises a pan-shaped bottom assembly 233B bridged by a full length cover assembly 233C which is secured in place by a plurality of locking hasps 233L. The bottom assembly 233B is comprised of a channel-shaped pan 233P arranged to receive and support a full length hat-shaped frame 233F, by engagement with edge flanges thereof. Corresponding walls of these elements are spaced appropriately to define a U-shaped insulation space which is filled with a urethane or other suitable insulation U. A U-flange 233U covers one end of the bottom assembly 233B.

The insulation U is foamed in place by turning the bottom assembly 233B on end and progressively pouring the insulation into the space through a series of wall openings 233H spaced along the pan 233P. This provides a sturdy fully insulated unit.

The cover assembly 233C includes a channel-shaped top 233T defining an open lower face spanned by an oppositely shaped flush mounted insert section 233S which is secured in place to define a generally rectangular insulation space. Openings are provided at spaced locations along the cover assembly to facilitate pouring the insulating composition into this space to foam in place therein. A channel-shaped head baffle 233H underlies the insert section 233S and extends substantially full length therealong to provide the entry plenum 233P. The head baffle 233H is provided with wall openings 233W spaced lengthwise therealong to distribute the cold gas flow entering the precool tunnel. The transverse flow speed of the cold gas stream in the precool tunnel 233 is about 800 to 1000 ft./minute. The excess gas continuously created in the precool tunnel gradually exfiltrates through its upstream end.

The exit conveyor 204 is also supported and housed in insulated ducting providing a postcool exit tunnel 234 through which a regulated exfiltration flow of gaseous nitrogen is provided. Control of the exfiltration flow through the inlet and outlet tunnels is balanced by appropriate adjustment of the position of the valves 217V. Operation of the process chamber at pressures slightly greater than atmospheric maintains a regulated exfiltration flow through these tunnels. Thus, assuming the vane position shown in full lines in FIG. 18A, to increase the exfiltration rate through the outlet tunnel 234, each of the vanes is shifted to the dotted line position.

The insulated exit tunnel 234 may be generally similar in construction to the inlet tunnel 233 and thus consists of a hollow walled sheet metal structure having foam insulation U filling its hollow walls. The tunnel 234 may have a generally U-shaped bottom assembly 234B spanned by a top cover assembly 234C secured in place by a plurality of locking hasps 234L. The insulation U is foamed in place in a fashion similar to that described in connection with the inlet tunnel.

At each end, the vacuum insulated main housing has a set of three radial fins 200F defining spaces which receive and confine polyurethane foam insulation U which is foamed in place and finally covered by a stainless steel shroud 200S to comprise the inlet and exit spools 206 and 207. The external connections to the process chamber enter through the spools 206 and 207 so that the main length of the unit is free of external connections. An external drain 206D is shown in FIGS. 20 and 21 at the lowest point in the entrance spool for use in draining wash water from the process chamber.

An end cap or entrance head 206H consisting of a stainless steel shell filled with urethane foamed in place is completely separate of the entrance spool and is removably locked in place across its mouth by a number of locking hasps 206L. Similarly, an exit head 207H also comprised of a foam insulated shell is removably locked in place across the mouth of the exit spool 207 by a number of locking hasps 207L.

The entrance head 206H is of disc shape and has a rectangular opening of a size to accommodate the end extensions 265E and 266E which carry the main conveyor idler shaft 269. The exit head 207H is similar and additionally is provided with a U-shaped section 207U extending alongside the corresponding end extensions 265E and 266E in which the main conveyor drive shaft 268 is mounted.

The drive for the main conveyor 202 includes an externally mounted motor 270 connected to a drive chain 270C which engages a sprocket 270S. The drive shaft 268 has a removable extension 268E projecting through the bucket and exit tunnel walls and mounting the sprocket 270S and carried in external bearings 271.

The drive for the entrance conveyor 203 includes a motor 272 (FIG. 24) connected to a drive chain 272C which engages a sprocket 272S mounted on a removable shaft extension 273E which is coupled to the entrance conveyor drive shaft 273. The main drive shaft 273 is journaled in the walls of the entrance tunnel 233 and the shaft extension is journaled in outboard bearings 274. The drive for the exit conveyor is similar to that shown and described for the entrance conveyor and is not shown and described in detail herein.

The removable support structure 261, as best shown in FIGS. 18, 20 and 21, has a removable drain line 214 exiting from the reservoir 210 and leading through the spool 207 to the pumping mechanism 211. The drain line 214 is equipped with an anchoring rod 214R that is threadedly engageable with a fixed seat 214S mounted within the trough-shaped pan 267 to facilitate leak proof connection and removal of the drain line incident to withdrawal of the support structure 261. The anchoring rod 214R projects through the drain line 214 and exits in sealed relation through a bend region thereof to be accessible externally. The main conveyor 201 is supported entirely by the support structure 261 and upon disengagement of the drive shaft extension 268E and the drain line 214, the support structure is freed for easy removal.

The extensions 265E and 266E at each end of the support structure 261 mount the shafts of the main conveyor 268 and 269 outboard of the main process chamber. The end extensions are equipped with fixedly mounted lubric plastic bearing blocks 275 to serve as bearings for the shafts 268 and 269. A material such as is marketed under the trade name KEL–F is used for these bearing blocks and it presents an effective anti-friction action even in the presence of the extremely low temperatures encountered in the flash freezer unit.

A simplified self-adjusting mechanism, as shown in FIGS. 25, 25A and 25B, is provided for maintaining the conveyor belt free of slack. The end extensions 265E, 266E of the side panels of the support frame superstructure are provided at their outboard regions at the discharge end of the conveyor with aligned mounting holes to receive a primary pivot shaft 276 and a pair of fixed axis idler shafts 277, 278, each mounting an idler roller 277R, 278R. The pivot shaft 276 extends laterally beyond the side rails 265, 266 and mounts a pair of support links 279 that carry a floating axis idler shaft 280 that is interposed between the fixed axis rollers 277R, 278R and equipped with a roller 280R engageable with the upper surface of the lower flight of the conveyor belt 202. The primary pivot shaft 276 is equipped with a depending crank 281 hingedly connected to a stepped diameter reciprocating rod 282 mounted in a fixed housing 283 and normally biased by a spring 283S acting to urge the rod to the left, as viewed in FIGS. 25A and 25B. Thus, the spring 283S normally tends to rotate the primary pivot shaft 276 and the support links clockwise, as viewed in FIG. 25B, so that the floating idler roller 280R is drawn downwardly in the space between the fixed axis idler rollers and imposes a prescribed predetermined tautness upon the conveyor belt 202. The tautness of the belt is maintained automatically, with changes in belt length associated with changes in temperature being continuously compensated by the biasing action of the spring 283S.

It should be noted that in the case of the embodiment shown in FIGS. 18 to 26, the stream of recirculating gaseous nitrogen follows a generally downwardly directed transverse flow and functions in conjunction with the stainless steel conveyor 202 to effect optimum heat transfer with the articles. The conveyor 202 serves as a plate freezer in contact with the underface of each article. The downward stream flow loads the article towards the plate freezer and also continuously impinges and flows against and around the top and side surfaces of each article. Thus, more effective total cooling is accomplished.

In view of the plate freezer action of the main conveyor, provision is made for preventing articles from sticking to the main conveyor. The separate entrance conveyor 203 operates in a higher temperature region defined by the entrance duct and suitably cooled by the regulated precooling flow delivered through the conduit 226. With this two stage arrangement, sticking of the articles to the entrance conveyor 203 can be avoided, as the articles are only precooled at this stage. Thereafter, the precooled articles are much less prone to stick to the main conveyor 202.

In all of the disclosed embodiments, the conveyor speed is variable in accordance with the nature of the product, the temperature differential to be produced and the length of the cooling path. By way of illustration, the conveyor speed may be on the order of 20 feet per minute.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for flash freezing articles comprising housing means defining a substantially thermally isolated process chamber, a conveyor operating in said chamber for transporting articles in succession along a process path leading through said chamber, said conveyor including a conveyor belt of thermally conductive material, means mounted within said chamber for directing a spray discharge of cryogenic liquid against each article at a certain region along said process path to flash said cryogenic liquid at least partially to gas for freshly generating gas within said chamber, pumping means having a suction inlet communicating with said chamber below said conveyor belt and a discharge outlet communicating with said chamber above said conveyor belt along another region of said process path to develop a high velocity stream traveling a generally downward transverse recirculation flow path through said chamber to impinge upon each article moving thereby, said another region extending for a substantial distance lengthwise along said process path and said stream being comprised partly of recirculated gas and partly of freshly generated gas, and means for discharging gas from the apparatus at a rate to cause most of said freshly generated gas to flow from said certain region to said another region.

2. Apparatus in accordance with claim 1 wherein the last named means is connected to direct gas to a region upstream of said another region to precool articles before the same reach said another region.

3. Apparatus in accordance with claim 1 and wherein upper internal wall structure defines an upper plenum chamber above said process path and lower internal wall structure defines a lower plenum chamber below said process path, said upper plenum chamber communicating with said pumping means and said upper wall structure having downwardly facing wall openings spaced along said another region to serve as discharge outlets for said pumping means, said lower wall structure having distributed wall openings along said another region and serving as suction inlets communicating with said pumping means through said lower plenum chamber.

4. Apparatus in accordance with claim 3 and including adjustable deflector means mounted in flow intercepting relation adjacent said downwardly facing wall openings and selectively shiftable to determine the streamwise component of travel of gas flowing therefrom.

5. Apparatus in accordance with claim 3 wherein said downwardly facing wall openings are of laterally elongated shape and said apparatus includes a separate deflector vane pivotal about an axis extending along and immediately below the downstream edge of each slot and positioning means connected to said vanes for shifting the same streamwise to control the streamwise component of travel of gas flowing from said discharge outlet.

6. Apparatus for flash freezing articles comprising housing means defining a substantially thermally isolated process chamber, means operating in said chamber for transporting articles in succession along a process path through said chamber, means for directing a spray discharge of a cryogenic liquid against each article at a downstream region along said process path to flash said liquid at least partially to gas and freshly generate gas within said chamber, pumping means having a suction inlet and a discharge outlet communicating with spaced locations at an upstream region along the process path to develop a high velocity stream traveling a recirculation flow path through said chamber to impinge upon each article as it passes said upstream region, said stream being comprised partly of recirculated gas and partly of freshly generated gas, and means for directing a precooling portion of the discharge from said pumping means to a region still further upstream to precool the articles before reaching the first-named upstream region.

7. Apparatus in accordance with claim 6 and wherein upper internal wall structure defines an upper plenum chamber above said process path and lower internal wall structure defines a lower plenum chamber below said process path, said upper plenum chamber communicating with said pumping means and said upper wall structure having downwardly facing wall openings spaced along said another region to serve as discharge outlets for said pumping means, said lower wall structture having distributed wall openings along said another region and serving as suction inlets communicating with said pumping means through said lower plenum chamber.

8. Apparatus in accordance with claim 7 and including adjustable deflector means mounted in flow intercepting relation adjacent said downwardly facing wall openings and selectively shiftable to determine the streamwise component of travel of gas flowing therefrom.

9. Apparatus in accordance with claim 7 wherein said downwardly facing wall openings are of laterally elongated shape and said apparatus includes a separate deflector vane pivotal about an axis extending along and immediately below the downstream edge of each slot and positioning means connected to said vanes for shifting the same streamwise to control the streamwise component of travel of gas flowing from said discharge outlet.

10. Apparatus in accordance with claim 6 and wherein the directing means causes a major portion of said freshly generated gas to flow upstream.

11. Apparatus in accordance with claim 6 and including adjustable deflector means mounted in flow intercepting relation adjacent said discharge outlet and selectively shiftable to affect the streamwise component of travel of gas flowing from said discharge outlet.

12. In apparatus in accordance with claim 6 and including sense means responsive to temperature at an exit region from said chamber and connected to control said directing means for regulating the amount of the precooling portion in a fashion to regulate the temperature at said exit region.

13. Apparatus for flash freezing articles comprising housing means defining a substantially thermally isolated process chamber, first conveyor means operating in said chamber for transporting articles in succession along a process path through said chamber, means for directing a spray discharge of a cryogenic liquid against each article at a downstream region along said process path to flash said liquid at least partially to gas and freshly generate gas within said chamber, pumping means having a suction inlet and a discharge outlet communicating with spaced locations at an upstream region along the process path to develop a high velocity stream traveling along a recirculation flow path through said chamber to impinge upon each article as it passes said upstream region, said stream being comprised partly of recirculated gas and partly of freshly generated gas, second conveyor means disposed at least partially within an insulated housing to transport said articles to said first conveyor means, and means for directing a portion of the discharge from said pumping means to said second conveyor means to precool the articles before reaching said first conveyor means.

14. In apparatus for flash freezing of articles and including hollow housing structure defining an elongated process chamber, means including a conveyor for transporting articles in succession along a process path leading into, through and out of said chamber, and spray nozzle mechanism within the chamber for directing a spray discharge of cryogenic liquid against each article at one region along the process path to flash partly to gas, liquid collector means beneath said region to receive excess liquid discharged from said spray nozzle mechanism, means for supplying cryogenic liquid to said spray nozzle mechanism and including an input line leading from a source of cryogenic liquid and connected to communicate with the spray nozzle mechanism for replacing liquid flashing to gas and liquid pumping means having an intake line communicating with the collector means to receive liquid therefrom and having a discharge line connected to communicate with the spray nozzle mechanism to supply liquid thereto.

15. In apparatus in accordance with claim 14 and wherein said spray nozzle mechanism includes manifold means supporting a plurality of nozzles in distributed relation and means separately connecting said input line and said discharge line to said manifold means.

16. In apparatus in accordance with claim 14 and including means for regulating means for regulating flow volume through said input line substantially in accordance with the rate of vaporization of gas in said chamber.

17. In apparatus in accordance with claim 14 and wherein said conveyor is of open mesh structure to allow vertical throughspray, said spray nozzle mechanism includes a spray header above said conveyor and connected to said discharge line from the liquid pumping means and a spray header below said conveyor and connected to said input line from the source of cryogenic liquid.

18. In apparatus for flash freezing of articles and including hollow housing structure defining an elongated process chamber open endwise at opposite ends thereof, removable support structure internally engaged with said housing structure for lengthwise shiftable movement through said process chamber, said support structure including opposite end extensions projecting outboard at each end of said process chamber, and means including shafts mounted outboard on said support structure and a conveyor bodily incorporated in said support structure and trained about said shafts for transporting articles in succession along a process path leading into, through and out of said chamber.

19. In apparatus in accordance with claim 18 and wherein said opposite end extensions mount lubric plastic bearing blocks for supporting each of said shafts.

20. In apparatus in accordance with claim 17 and wherein said input line from said source of cryogenic liquid includes a controlled valve for regulating flow to the spray header below said spray header and sense means responsive to liquid capacity in said liquid pumping means and connected to said controlled valve to effect modulated flow adequate to balance liquid entering the apparatus with liquid flashing to gas therein.

21. In apparatus for flash freezing of articles and including hollow housing structure defining an elongated process chamber open endwise, removable support structure internally engaged with said housing structure for lengthwise shiftable movement through said process chamber, said support structure including a bottom pan extending substantially the length of said process chamber and a conveyor frame superstructure mounted on said pan, conveyor means extending along and supported by said superstructure for transporting articles in succession along a process path leading through said chamber, pivot means at one end of said pan supporting said superstructure and removable means at the other end of said pan cooperably supporting said superstructure whereby upon partial endwise withdrawal of said removable support structure from said process chamber and upon disengaging said removable means, said pan pivots downwardly from said superstructure affording access to said conveyor means and said pan for facilitating washing and cleaning operations.

22. In apparatus for flash freezing of articles, a gas cooled tunnel comprising mating top and bottom elongated hollow walled sections, one of said sections being of U-shaped transverse configuration to present an open face and the other of said sections bridging the open face of said one section, each of said sections having lengthwise spaced wall openings, insulation foamed in situ within the hollow region of each section to fill and fully insulate the same, one of said insulated sections including a plate baffle extending lengthwise thereof in spaced relation thereto and provided with distributed wall openings to define a ported entry plenum and a gas inlet duct projecting through the last-named section and communicating with said entry plenum.

References Cited
UNITED STATES PATENTS

| | | | |
|---|---|---|---|
| 2,551,981 | 5/1951 | Thompson | 198—45 |
| 3,101,861 | 8/1963 | Mearns et al. | 220—10 |
| 3,226,947 | 1/1966 | Wakatsuki et al. | 62—380 X |
| 3,258,935 | 7/1966 | Ross | 62—374 |
| 3,277,657 | 10/1966 | Harper et al. | 62—63 |
| 3,298,188 | 1/1967 | Webster et al. | 62—64 X |
| 3,315,480 | 4/1967 | Rich | 62—380 X |
| 3,345,828 | 10/1967 | Klee et al. | 62—380 X |
| 3,385,075 | 5/1968 | Casale | 62—64 X |

WILLIAM E. WAYNER, Primary Examiner

U.S. Cl. X.R.

62—65, 302, 303, 374; 198—126